Dec. 23, 1941.　　　C. PAULSON　　　2,267,130
CLUTCH MECHANISM
Filed July 10, 1940
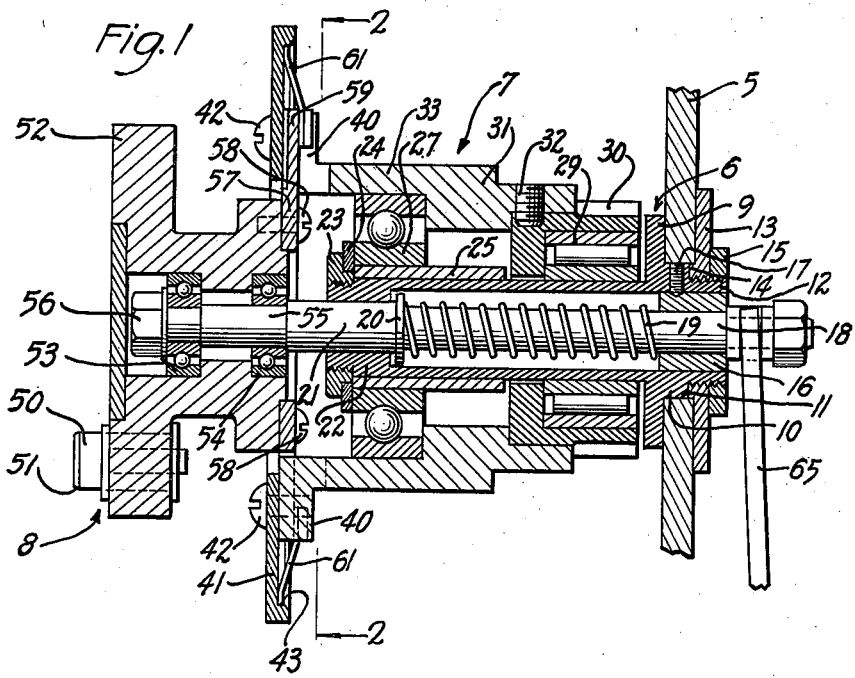
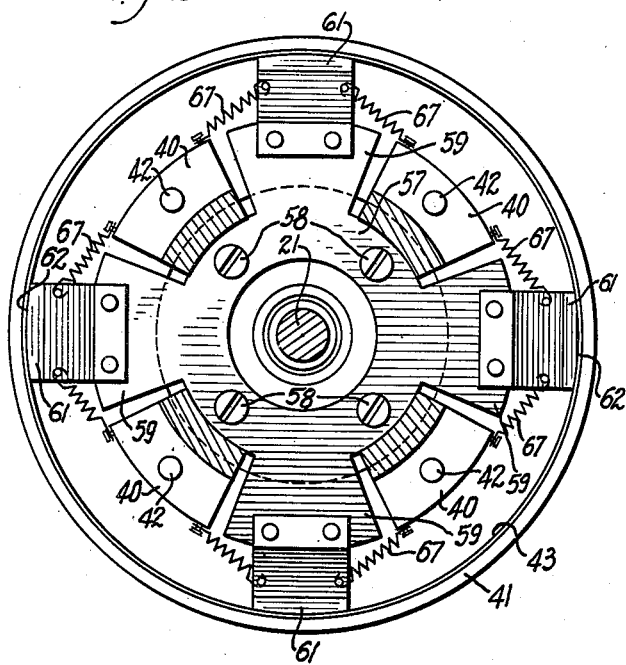
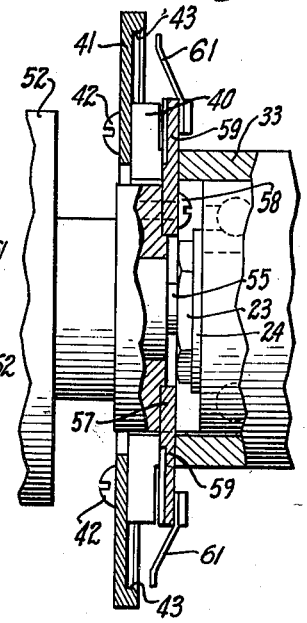
INVENTOR.
C. Paulson
BY Emery Robinson
ATTORNEY.

Patented Dec. 23, 1941

2,267,130

UNITED STATES PATENT OFFICE 2,267,130

CLUTCH MECHANISM

Christian Paulson, Elmhurst, Ill., assignor to Western Electric Company, Incorporated, New York, N. Y., a corporation of New York Application July 10, 1940, Serial No. 344,673

7 Claims. (Cl. 64—27)

This invention relates to clutch mechanisms and more particularly to a clutch having its driven element freely rotatable through a predetermined range and positively connectible to the driving element thereof at any point within said range.

It is an object of the present invention to provide a clutching mechanism, the driven element of which may be positively connected to the driving element at any point of their relative movement.

In accordance with one embodiment of the invention, a clutch is provided wherein the driving member of the clutch comprises a sleeve having radially extending arms which carry an annular member provided with an inwardly disposed annular shoulder and the driven element of the clutch has radially extending fingers which are interposed between the radially extending arms on the driving clutch sleeve. Each of the radially extending fingers on the driven clutch member carries, at its extremity, a leaf spring, the extending end of which conforms to the shape of the annular shoulder on the driving member whereby the driven member may be oscillated with respect to the driving member when the clutch is disengaged, and when the clutch is engaged, the resilient members carried by the driven clutch member will be forced into clamping engagement with the annular shoulder on the driving member.

A better understanding of the invention will be had by reference to the following detailed description when considered in conjunction with the accompanying drawing, wherein Fig. 1 is a vertical sectional view through a clutch, made in accordance with the present invention, wherein the clutch is shown engaged;

Fig. 2 is a vertical sectional view taken along the line 2—2 of Fig. 1 in the direction of the arrows and showing the relative position of the radially extending arms on the driving clutch member and the leaf springs on the driven member which engage the annular shoulder on the driving member; and Fig. 3 is a fragmentary side elevational view of the apparatus shown in Fig. 1, parts being broken away and the clutch being shown disengaged.

Referring to the drawing, wherein like reference numerals designate the same parts throughout the several views, the clutch embodying the invention is shown mounted on a panel 5 and comprises a fixed bearing sleeve, designated generally by the numeral 6, a driving member assembly, designated generally by the numeral 7, and a driven assembly, designated generally by the numeral 8. The fixed bearing sleeve 6 has a panel engaging shoulder 9 formed integrally with it, which engages the left-hand surface (Fig. 1) of the panel 5 and has a shoulder 10 formed on it which enters an aperture 11 in the panel 5. The right end of the bearing sleeve 6 (Fig. 1) is threaded, as shown at 12, to receive a threaded member 13 having a portion 14 adapted to enter the aperture 11 in the panel 5 and to receive a lock nut 15 for locking the threaded member 13 in place, whereby the clutch assembly is held fast in the panel 5. The sleeve 6 has a tubular member 16 fixed in its right end by means of a set screw 17 and is adapted to slidably support a push rod 18. The push rod 18 is normally urged to the left by a spring 19, which surrounds it, and engages the tubular member 16 and a shoulder 20 formed on the push rod. The push rod has an enlarged portion 21, which is slidable in a portion 22 of the sleeve 6 and the shoulder 20 prevents movement of the push rod 18 beyond a predetermined point due to its engagement with the portion 22 of the sleeve 6. The left end (Fig. 1) of the fixed bearing sleeve 6 is threaded to receive a threaded collar 23, which serves to hold a washer 24 against the end of a sleeve 25 surrounding the sleeve 6 and grippingly engaged with the sleeve 6 to, in turn, support a ball bearing assembly 27. Adjacent the shoulder 9, a roller bearing 29 is attached to the fixed bearing sleeve 6 and rotatably supports a ring gear 30, which meshes with a gear segment (not shown) for imparting oscillatory motion to the gear 30 and thereby the driving assembly 7 in one particular application of the clutch which is described in my copending application, Serial No. 344,672, filed July 10, 1940. The gear 30 has an annular sleeve 31 fixed to it by means of a set screw 32. The ring gear 30 and annular sleeve 31 form a part of the driving assembly 7 and the annular sleeve 31 has a portion 33 thereof in engagement with the ball bearing assembly 27 whereby the driving assembly 7 is rotatably mounted on the fixed bearing sleeve 6.

Extending radially outwardly from the portion 33 of the annular sleeve 31 are a series of projecting members 40—40, which are spaced equally about the sleeve 31 and have fixed to them an annular member 41, which is held in place on the members 40 by means of screws 42—42, and which is provided with an annular shoulder 43.

The driven assembly 8 comprises an article engaging finger 50, which is tapered slightly, as shown at 51, to engage an article to be driven through the action of the clutch. The taper on the finger 51 is provided so that the article to be driven is not moved from its normal position when the finger 50 enters an aperture (not shown) in the article to drive the article, but the driven assembly 8 will, thereby, be shifted with respect to the driving assembly 7 so that the article will always be driven an amount dependent upon the amount the driving assembly is driven. The finger 50 is fixed to and extends outwardly to the left (Fig. 1) from an annular member 52, which is mounted, by means of ball bearing assemblies 53 and 54, on a reduced portion 55 of the push rod 18, the ball bearing assemblies being held on the end of the push rod by means of a nut 56 threaded onto the reduced portion 55 of the push rod 18. A relatively stiff disc 57 is fixed, by means of screws 58—58, to the annular member 52 and has formed integrally with it a series of arms 59—59, which extend outwardly from the disc 57 in the spaces between the projecting members 40—40. Each of the arms 59 has a flat relatively wide spring 61 attached to it and bent to the configuration as shown most clearly in Figs. 1 and 3. The outwardly extending ends of the springs 61 are rounded, as shown at 62, on an arc whose diameter conforms to the diameter of the shoulder 43, and the springs are bent so that when the push rod 18 is moved to the position shown in Fig. 1 by means of the spring 19, the free ends of the springs 61 will first engage the flat surface of the annular member 41 and will then be spread outwardly, due to their inherent resilience, until the rounded edge 62 of each of the springs 61 grippingly engages against the shoulder 43 on the annular member 41. A plurality of springs 67—67 are provided to normally hold the projecting members 40 and the arms 59 equally spaced. Thus the driven assembly 8 has a limited floating or free movement, relative to the driving assembly 7 due to the cooperating intermeshing arms 59—59 and members 40—40 and the interconnecting springs 67—67. The driven assembly 8 is thus permitted to rotate slightly one way or the other when the finger 51 thereof enters the aperture (not shown) in the article to be driven in case the finger and the aperture are not in alignment.

The clutch mechanism is shown engaged in Fig. 1 and disengaged in Fig. 3. In the operation of the clutch, an actuator 65 (Fig. 1) may be rocked in a clockwise direction against the pressure of spring 19 to disengage the driven and driving clutch assemblies or may be released to permit the spring 19 to rock it in a counterclockwise direction to the position shown in Fig. 1 to cause the engagement of the driving and driven clutch assemblies. When the push rod 18 is moved to the position shown in Fig. 1 by the action of the spring 19, the free ends of the springs 61 will engage the shoulder 43 at any point within the range of movement between the driven and driving assemblies.

Although a specific embodiment of the invention has been described hereinbefore, it will be understood that the invention is to be limited only by the scope of the appended claims.

What is claimed is:

1. A clutch mechanism including a driving member, an annular member fixed to said driving member and having a shoulder adjacent its periphery, a driven member, a plurality of resilient members fixed to said driven member and having their free ends formed to conform to said shoulder, cooperating intermeshing spaced means on said driving and driven members for limiting relative rotary movement therebetween, yieldable means arranged for normally holding the intermeshing means equally spaced, and means for forcing said resilient members to engage said shoulder to interconnect the driving and driven members.

2. In a clutch mechanism, a driving assembly including a rotatable annular member having an axially extending shoulder, a driven assembly including a rotatable disc, a plurality of members extending radially outwardly from said disc, resilient members fixed to said radially outwardly extending members, cooperating spaced intermeshing means on said annular member and disc for limiting relative rotary movement therebetween, yieldable means arranged for normally holding the intermeshing spaced means equally spaced, and means for shifting said disc axially to bend said resilient members into engagement with said axially extending shoulder on the annular member in the driving assembly.

3. A clutch comprising a fixed bearing sleeve, a driving assembly rotatable about said bearing sleeve, an annular member in said driving assembly having an axially extending annular shoulder formed thereon, a push rod slidable in said fixed sleeve, an annular member rotatable about and movable longitudinally with said push rod, an annular disc fixed to said second mentioned annular member and having radially extending arms, a radially extending resilient member fixed to each of said arms, and means including said push rod for longitudinally moving said second mentioned annular member to press said resilient members into engagement with said first annular member and thereby to extend the free ends of the resilient members into clamping engagement with the axially extending shoulder.

4. In a clutch mechanism, a driving assembly and a driven assembly, an annular member forming a part of said driving assembly, said annular member being provided with an annular shoulder adjacent its periphery, a plurality of radially extending resilient members forming a part of said driven assembly, and means including a push rod about which said driving and driven assemblies rotate for moving said resilient members into engagement with said annular member to flex said resilient members and force their ends radially outwardly into engagement with the shoulder on the annular member.

5. In a clutch mechanism, a driving assembly, a driven assembly, an annular sleeve in said driving assembly, a plurality of radially projecting members on said annular sleeve, an annular member fixed to said projecting members and having a flat surface at right angles to the axis of the driving and driven assemblies, an annular shoulder formed on said annular member and extending in a direction parallel to the axis of the driving and driven assemblies, a disc in the driven assembly, a plurality of radially extending springs fixed to said disc and having their free ends rounded on an arc of the same diameter as the inside diameter of said shoulder, means for shifting the driven assembly with respect to the driving assembly to carry said springs against the surface of the annular member in the plane at right angles to the axis of the assemblies, thereby to force the springs radially outwardly into engagement with said shoulder.

6. In a clutch mechanism, a driving assembly including an annular member terminating in an annular shoulder having a smooth circular surface, and a driven assembly connectible to said driving assembly including a series of springs extending radially of the driven assembly and having their free ends formed on an arc, the diameter of which corresponds to the diameter of the smooth surface of said shoulder, and means including a spring actuated rod attached to said driven assembly for pressing said springs against the annular member to flex them radially outwardly to force their free ends into clamping engagement with the smooth surface of said shoulder.

7. A clutch mechanism including a driving member, an annular member fixed to said driving member and having a shoulder adjacent its periphery, a driven member, a plurality of leaf springs fixed to said driven member and having their free ends formed to conform to said shoulder, cooperating intermeshing spaced means on said driving and driven members for limiting relative rotary movement therebetween, springs interconnecting said intermeshing spaced means for normally holding the same equally spaced, and means for forcing said leaf springs to engage said shoulder to interconnect the driving and driven members.

CHRISTIAN PAULSON.